INVENTORS
WILLIAM B. HOMMEL
KNUTE SUNDELL
BY
ATTORNEYS

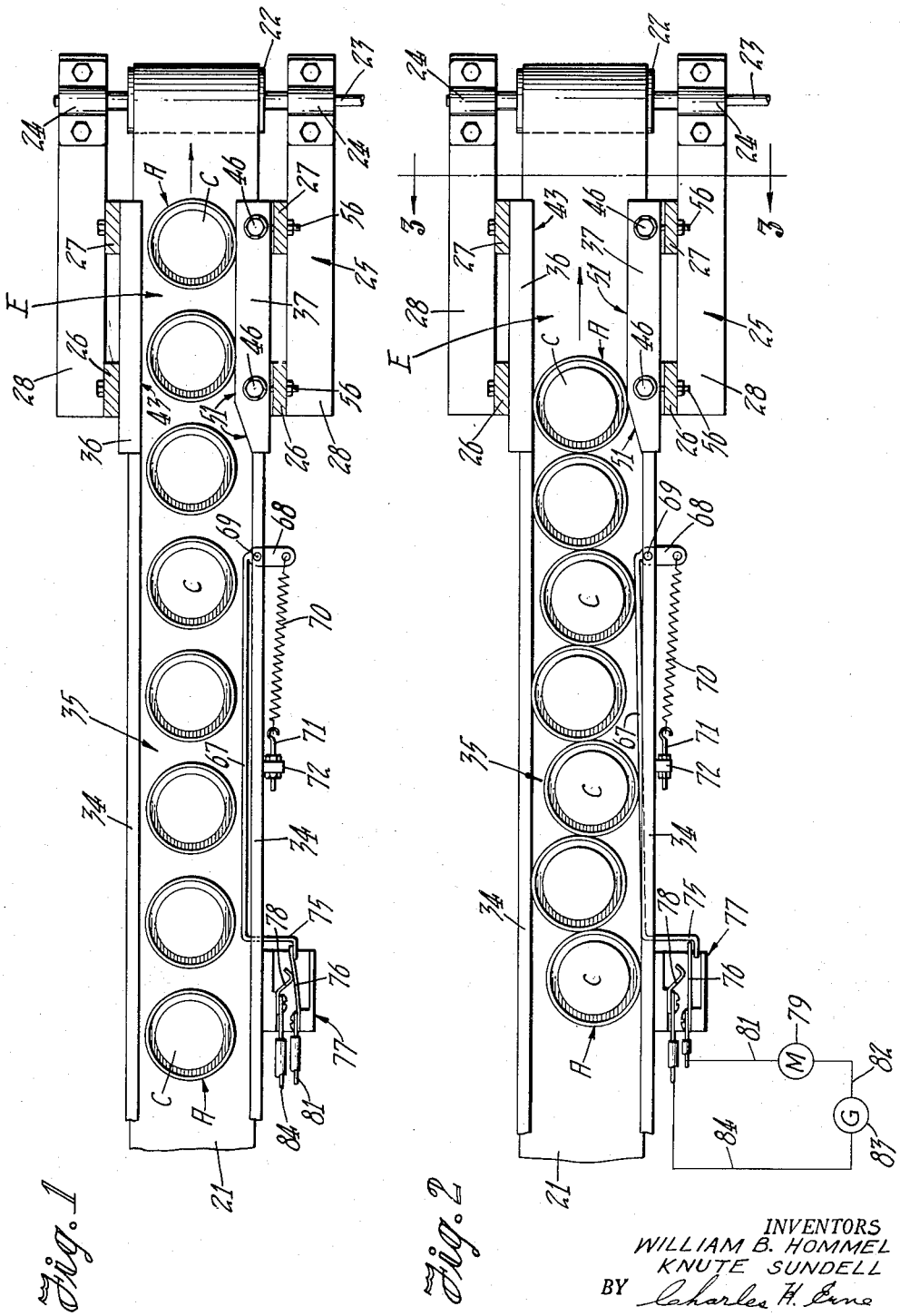

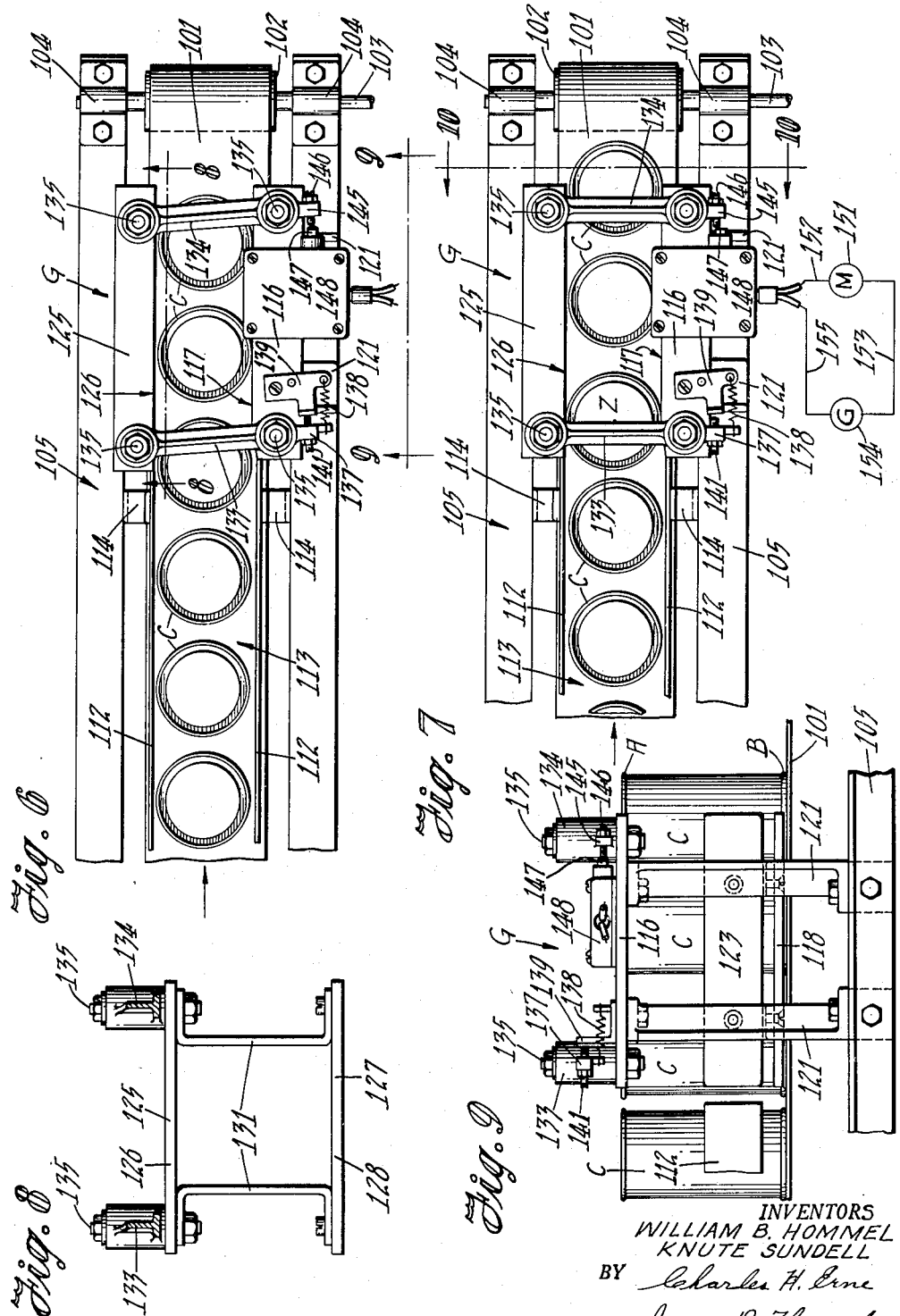

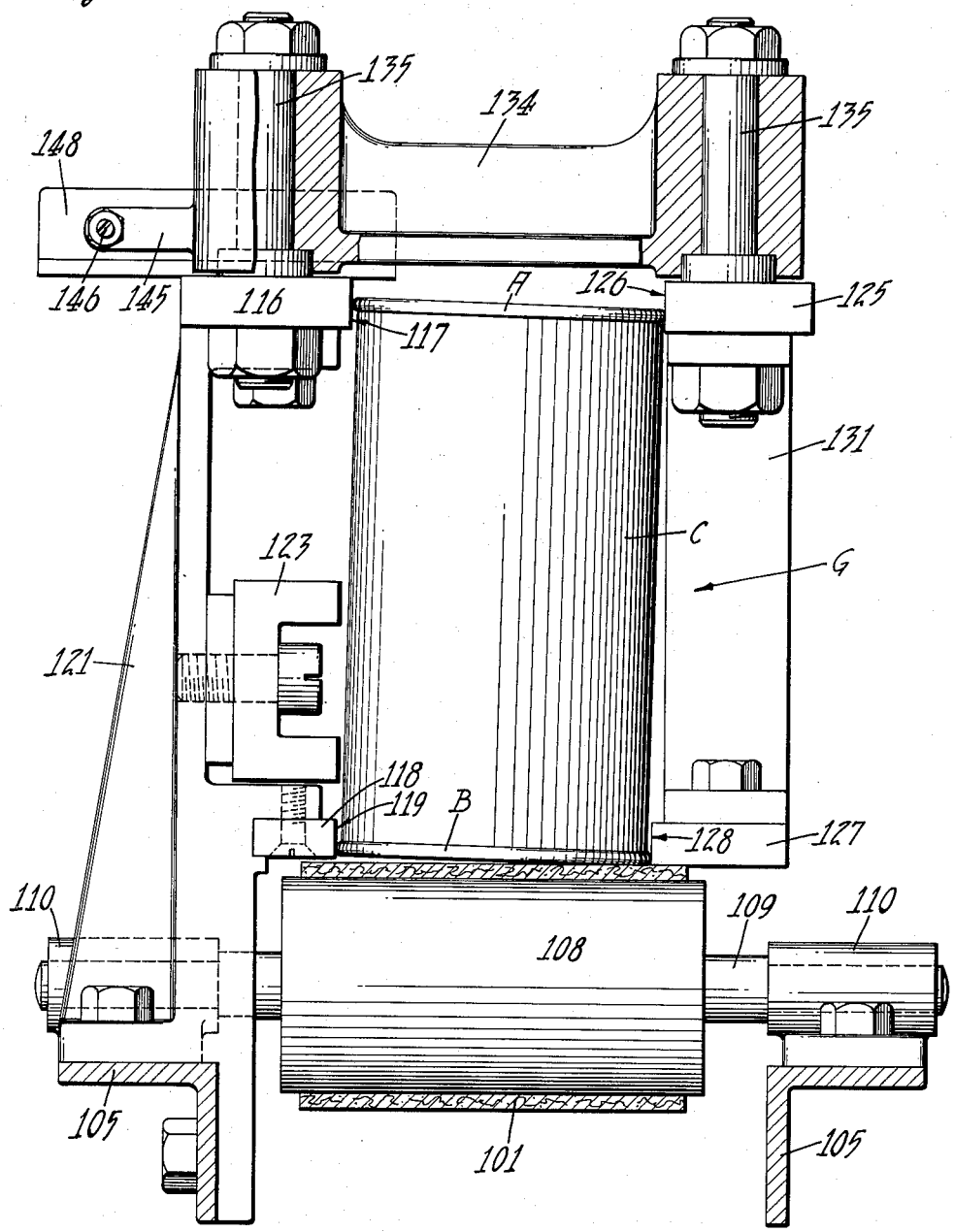

United States Patent Office 2,742,993
Patented Apr. 24, 1956

2,742,993

APPARATUS FOR GAUGING ARTICLES

William B. Hommel, Gurnee, and Knute Sundell, Waukegan, Ill., assignors to American Can Company, New York, N. Y., a corporation of New Jersey Application December 26, 1950, Serial No. 202,642

9 Claims. (Cl. 192—125)

The present invention relates to apparatus for gauging articles according to a predetermined dimension in order to detect and segregate articles of abnormal dimension, especially round articles and has particular reference to devices for detecting diametrical variances or peripheral irregularities in seams, ridges, annular shoulders, flanges, beads or other portions of articles.

The invention is particularly useful in the manufacture of sheet metal or fibre containers where it is important to check the completeness of end seams which unite the top and bottom closure members to the bodies of the containers. In the manufacture of such containers or cans the outside diameter of the body portion is usually held within close tolerances in order to facilitate proper fitting and attachment of the end closure members in suitable tight end seams to prevent leakage of air or liquids through the seams.

Under modern high speed manufacturing conditions a container occasionally may be produced with a defective incomplete or unfinished end seam which may result in a leaky seam. Such a faulty seam may be caused by a number of conditions, such as looseness of the seam, unfinished portions of the seam, improper pressures on the seam during formation, or other abnormal conditions, but in any case the result is an increase over the normal outside diameter of the end seam.

The instant invention contemplates a novel apparatus which utilizes this increased diametrical dimension of the seam to detect abnormal seams and provides for the segregation of cans having such seams.

An object of the invention is the provision of an apparatus for gauging the end seams of round containers or cans to detect seams which are incomplete or unfinished so that cans embodying such abnormal or faulty seams may be segregated from cans having proper seams.

Another object is the provision of such an apparatus wherein detection of abnormal seams is effected while the cans are advancing in a susbtantially continuous procession.

Another object is the provision of such an apparatus wherein both top and bottom end seams of the cans are gauged simultaneously so that detection of an abnormal seam at the top or the bottom of the can will cause the can to be designated for segregation or rejection.

Another object is the provision of such an apparatus wherein the cans to be gauged are rotated sufficiently, at least through an angle of 180 degrees, to effect gauging of the whole peripheral portion of the cans to be gauged.

Another object is the provision of such an apparatus wherein the cans are tilted relative to their path of travel to effect efficient rotation of the cans during the gauging operation.

Another object is the provision of such an apparatus wherein detection of an abnormal seam in a can causes the stoppage of further feeding of cans into the procession so that the detected can may be readily removed from the procession.

Numerous other objects and advantages of the invention will be apparent as it is better understood from the following description, which, taken in connection with the accompanying drawings, discloses a preferred embodiment thereof.

Referring to the drawings:

Figure 1 is a top plan view of an apparatus embodying the instant invention, with parts broken away and with cans shown in place in the apparatus;

Fig. 2 is a view similar to Fig. 1, showing how a can with an abnormal seam is detected and how it stops the feeding of incoming cans into the procession of cans passing through the apparatus, the view including a wiring diagram of the electric elements used in the apparatus;

Figs. 6 and 7 are top plan views with an an electric wiring diagram of a modified form of the invention, Fig. 6 showing good cans passing through the apparatus and Fig. 7 showing the parts in a different position caused by detection of a can with an incomplete seam, parts of the views being broken away;

Fig. 8 is a sectional view taken substantially along the line 8—8 in Fig. 6;

Fig. 9 is an elevational view taken substantially along a plane indicated by the lines 9—9 in Fig. 6, with parts broken away; and Fig. 10 is an enlarged sectional view taken substantially along the line 10—10 in Fig. 7.

Figure 3:
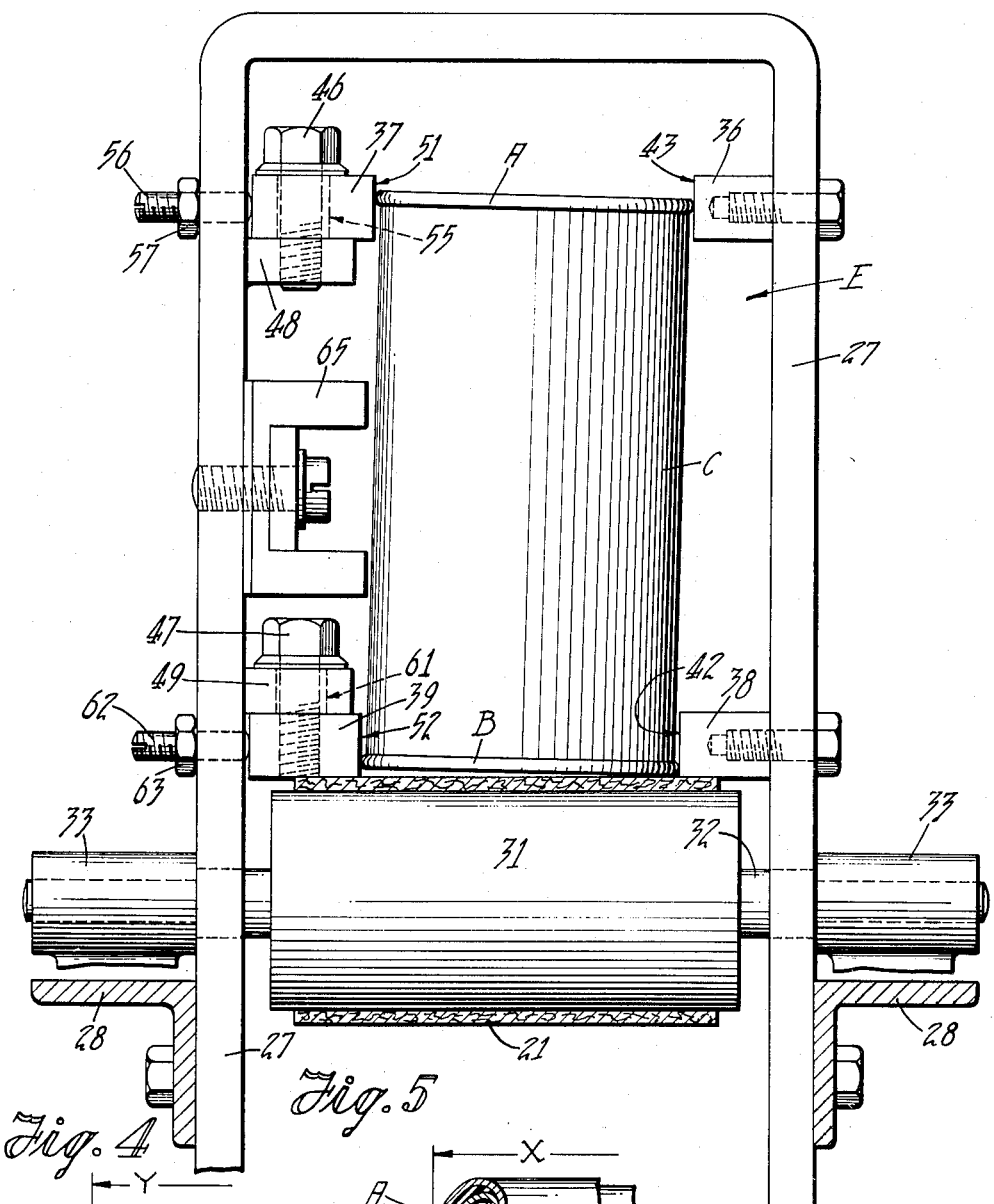
Fig. 3 is an enlarged sectional view taken substantially along the line 3—3 in Fig. 2, with parts broken away, and with a container in place.

As a preferred or exemplary embodiment of the instant invention Figs. 1, 2 and 3 of the drawings illustrate a testing apparatus for gauging predetermined overall diametrical dimensions of round or cylindrical articles, for example the outside diametrical dimensions of the top and bottom interfolded or double seams A, B (Fig. 3) of cylindrical containers C sealed with end closure members held in place by the seams. The seams A, B preferably are of the character shown in Fig. 4 and when properly made as a finished seam have a predetermined outside diametrical dimension Y. Containers having such finished seams, when fed into the testing or gauging apparatus of the instant invention pass through without difficulty and are discharged as normal or good containers.

Figure 5:
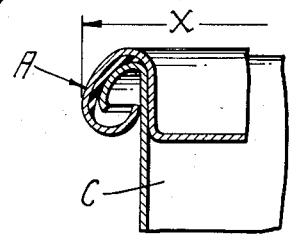
Fig. 5 is a view similar to Fig. 4, showing an improperly dimensioned, or incomplete or unfinished seam.

If either one or both of the end seams A, B of a container or a portion of these seams are deformed, incomplete or otherwise abnormal, such as for example the unfinished seam shown in Fig. 5, the outside diametrical dimension (indicated by the letter X) of the entire seam or of a portion thereof will be greater than for a finished or normal seam. When containers having such irregular or abnormal seams are fed into the gauging apparatus, they are immediately detected so that they can be removed or segregated from the containers with normal seams, and in this manner containers with abnormal seams which may be leaky are prevented from being used.

In the apparatus, the containers C are fed into the machine from any suitable source of supply, such as a closing machine, in a continuous substantially straight line procession and in spaced order. The containers are received on a continuously moving endless carrier belt 21 (Figs. 1, 2 and 3) which preferably is disposed in a horizontal position and which carries the containers through a testing or gauging station E.

At its discharge end, the belt operates over a driving pulley 22 (Figs. 1 and 2) mounted on a driving shaft 23 journaled in bearings 24 formed in a frame 25. The frame preferably comprises a pair of vertically disposed spaced and parallel inverted U-shaped leg members 26, 27 which are tied together by horizontally disposed longitudinal angle irons 28 secured to the leg members as best shown in Fig. 3. The bearings 24 are secured to portions of the angle irons 28 that extend beyond the leg member 27. The driving shaft 23 journaled in the bearings may be rotated in any suitable manner, for example by a separate driving instrumentality, such as an electric motor, or by connection with the closing machine, to effect proper timed advancement of the procession of containers carried on the belt.

At its entrance end, the belt 21 operates over an idler pulley 31 (Fig. 3) mounted on an idler shaft 32 journaled in bearings 33. The bearings may be supported in a suitable frame or if desired may be supported on the closing machine from which the containers are fed. A pair of spaced and parallel guide bars 34 extending along the outer edges of the upper run of the carrier belt 21 provide a runway 35 for the guidance of the containers during their travel with the belt.

At the testing or gauging station E, the device is provided with two opposed pairs of horizontally disposed vertically spaced and parallel gauge rails or bars, said rail pairs respectively comprising upper gauge rails 36, 37 and lower gauge rails 38, 39 (see Fig. 3) which extend longitudinally of and are spaced above the container carrier belt 21 and are also disposed adjacent the edges of the belt so that the containers can pass between the upper and lower rails of the oppositely disposed rail pairs. Along one edge of the belt, the right as viewed in Fig. 3, the upper and lower rails 36 and 38 of one rail pair are fixed or stationary and are bolted to one leg of the U-shaped members 26, 27 (Figs. 1, 2 and 3). The fixed lower rail 38 is disposed immediately above the carrier belt 21 and is formed with a smooth straight inner gauging face 42 which extends parallel with the carrier belt for engagement with the lower end seam B of a container C carried on the belt.

The upper fixed gauge rail 36 is formed with a smooth straight inner gauging face 43 which extends parallel with the face 42 of the fixed lower rail 38. This upper rail 36 is spaced above the lower rail 38 a distance substantially the height of a container to be gauged so that the upper end seam A of the container when carried on the belt 21 will be opposite the gauging face 43 of the upper rail 36. This upper rail 36 preferably is narrower than the lower rail 38 so that the face 43 of the rail 36 is laterally offset or disposed out of the vertical plane of the face 42 of the lower rail 38, thus requiring tipping of the container on the belt outwardly, toward the right as viewed in Fig. 3, to permit engagement of both the upper end seam A and the lower end seam B of the container with the upper and lower gauge rails 36, 38.

In alignment with the opposite edge of the belt 21, the upper gauge rail 37 and the lower gauge rail 39 of the oppositely disposed rail pair are secured by bolts 46, 47 to respective lugs 48, 49 which project inwardly from the leg members 26, 27 at the left as viewed in Fig. 3. These gauge rails like the fixed rails 36, 38 also extend longitudinally of the carrier belt 21, and are disposed in parallelism with the fixed rails 36, 38. The upper gauge rail 37 is disposed directly opposite the upper gauge rail 36, and is formed with a smooth straight gauging face 51 for co-operation with the gauging face 43 of the rail 36 in gauging the upper end seams A of containers C carried on the belt 21. In a similar manner the lower gauge rail 39 is disposed directly opposite the lower gauge rail 38, and is formed with a smooth straight gauging face 52 for co-operation with the gauging face 42 of the rail 38 in gauging the lower end seams B of the containers.

Figure 4:
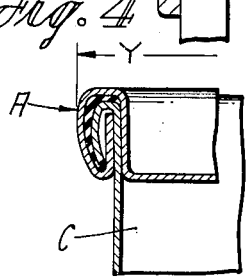
Fig. 4 is an enlarged sectional view of the seam portion of the container shown in Fig. 3, showing a properly dimensioned completed seam.

The transverse spacing of the upper gauge rails 36, 37 of the opposed rail pairs is such that the distance between the respective inner gauging faces 43, 51 of the rails is substantially equal to but not less than the outside diameter of a normal container top end seam A such as shown in Fig. 4 so that such a seam will just pass between the gauging faces without binding or jamming. In order to provide for such accurate setting of the gauge rail faces, the upper gauge rail 37 is made adjustable relative to its supporting lugs 48. For this purpose the bolts 46 which secure the rail 37 to its lugs 48, extend through enlarged holes or slots 55 in the rail to allow for shifting of the rail. Set screws 56, provided with locknuts 57, are threadedly engaged in the leg members 26, 27 opposite the rail for making the adjustment and for holding the rail in adjusted position.

In a similar manner the lower gauge rails 38, 39 of said opposed rail pairs are spaced apart so that the distance between their respective inner gauging faces 42, 52 is substantially equal to but not less than the outside diameter of a normal container bottom end seam B so that such a seam will just pass between the gauging faces without binding or jamming. As in the instance of the upper rail 37, the lower gauge rail 39 is made adjustable by virtue of enlarged bolt holes or slots 61 in the support lugs 49 through which the bolts 47 extend to hold the lower rail in place. Adjustment of the rail is effected through set screws 62 threadedly engaged in the leg members 26, 27 opposite the rail. These screws are provided with locknuts 63.

As mentioned above in connection with the laterally offset gauging faces 43, 42 of the respective fixed gauge rails 36, 38, the gauging face 51 of the upper adjustable gauge rail 37 is laterally offset or disposed inwardly of the vertical plane of the face 52 of the lower adjustable gauge rail 39 in order to co-operate with the fixed gauge rails 36, 38 in tilting the containers during passage through the gauging station. To facilitate entrance of the containers between the gauge rails, the leading ends of the gauging faces 51, 52 of the upper and lower adjustable gauge rails 37, 39 are tapered outwardly as shown in Figs. 1 and 2.

Between the upper and lower adjustable gauge rails 37, 39 the leg members 26, 27 carry a horizontally disposed container retarding element or stationary magnet 65 (Fig. 3) which extends for substantially the full length of the gauge rails. This magnet preferably is a permanent magnet but may be an electromagnet if desired. The magnet is disposed adjacent the path of travel of the container passing through the gauging station but does not touch the containers. It attracts them without touching and thus draws them toward the adjustable gauge rails 37, 39 to insure engagement of the top and bottom end seams A, B of the containers with the gauging faces 51, 52 of the adjustable gauge rails.

In operation, the containers C deposited on the carrier belt 21 in an upright position are carried by the belt in a procession toward the gauging station E. As the leading container enters the gauging station, it is guided, by the tapered leading ends 51 of the adjustable gauge rails 37, 39, into a position between these rails and the fixed gauge rails 36, 38. Upon entering between the fixed and the adjustable gauge rails, the leading container is immediately attracted, through the magnet 65, to the adjustable gauge rails and its advancement through the gauging station is thus retarded. Due to the offset position of the upper gauge rails 36, 37 relative to the lower gauge rails 38, 39 as heretofore explained, the container is tilted as best shown in Fig. 3 so that the bottom end seam B engaging against the gauging face 52 of the adjustable lower gauge rail 39, is lifted free of the belt. This locates the container in an angular or tilted position resting on only a portion of the bottom end seam B adjacent the fixed lower gauge rail 38.

If the container C thus positioned at the gauging station E as explained above, is provided with completed normal upper and lower end seams A, B as shown in Fig. 4, the carrier belt 21, through contact with the portion of the bottom end seam B adjacent the fixed lower gauge rail 38, and by reason of the retarding action of the magnet 65, rotates the entire container and thus rolls its top and bottom end seams A, B along the gauging faces 51, 52 of the adjustable gauge rails 37, 39 while the magnet 65 attracts the container to maintain this rolling engagement. In this manner, the container is rotated through slightly more than 180 degrees to insure that more than one half of the circumferences of the top and bottom end seams A, B roll on the gauging faces 51, 52. The other half of the circumferences are gauged by the gauging faces 42, 43. Thus the entire circumferences of the two seams are gauged to insure gauging of the whole periphery of the seams.

If the top and bottom end seams A, B are completed, normal seams as shown in Fig. 4, their overall outside diameters will be slightly less than (by a few thousandths of an inch) the spaces between the fixed gauging faces 42, 43 and the adjusted gauging faces 51, 52, and thus the container will freely roll through the gauging station E and will be discharged from the belt to any suitable place of deposit for normal containers. Figure 1 shows normal containers passing through the gauging station in accordance with the above explanation, the clearance space between the end seams and the fixed gauge rails being greatly exaggerated for the purposes of illustration. This space, in practise may be limited to a few thousandths of an inch.

If a container upon entering the gauging station E is abnormal in that it is formed with one or both end seams incomplete or merely a portion of the end seams incomplete or otherwise deformed as mentioned above, it jams between one or the other or both pairs of the gauge rails as shown in Fig. 2 and thus ceases to advance with the carrier belt 21.

When a container jams at the gauging station it may be removed manually by an operator immediately, or if desired, the jammed container may set in motion a stop device which automatically warns by way of a signal that the container has jammed or it may stop further feeding of containers into the runway 35 by stopping the closing machine or may merely stop further operation of the carrier belt.

Where the stoppage of container feeding or the carrier belt is desired, a runway control device is used which preferably includes a pressure bar 67 (Figs. 1 and 2). This pressure bar 67 is disposed in the runway 35 adjacent one of the runway guide bars 34. One end of the pressure bar is formed with a lever arm 68 which intermediate its ends is mounted on a pivot pin 69 secured in the adjacent guide bar 34. The outer end of the lever arm 68 is connected to a tension spring 70 which is secured to a hook 71 engaged in a lug 72 projecting from the guide bar. The spring normally keeps the pressure bar 67 in the runway 35 in the position shown in Fig. 1.

The opposite end of the pressure bar 67 is formed with an L-shaped hook 75 which engages under a spring contact 76 of an electric switch 77 and normally holds the spring contact against a fixed contact 78 of the switch as best shown in Fig. 1. These contacts 76, 78 are connected to an electric circuit (Fig. 2) which includes an electric motor 79 which may drive the container closing machine or the carrier belt hereinbefore mentioned.

In the wiring diagram of the circuit shown in Fig. 2, the spring contact 76 of the switch 77 is connected by a wire 81 to the motor 79. A wire 82 connects the motor with a suitable source of electric current such as a generator 83 and the generator in turn is connected by a wire 84 to the fixed contact 78 of the switch 77. Thus when the switch 77 is closed as shown in Fig. 1 as when containers are normally passing through the runway 35, the motor circuit is closed and current passing along this circuit excites the motor 79 and keeps the closing machine in operation to feed containers into the runway, or maintains the carrier belt 21 in operation to advance the containers toward the gauging station E.

However, when a container jams in the gauging station E as explained above, the containers backing up behind it in the runway force the pressure bar 67 outwardly as shown in Fig. 2 and this relieves the holding pressure on the spring contact 76 of the switch 77. The spring contact 76 thereupon springs away from the fixed contact 78 and the switch 77 thereupon opens. The opening of the switch breaks the motor circuit and thus the motor 79 stops operating. This stops the closing machine or the carrier belt and hence stops the feeding of containers into the runway 35 or stops advancement of the procession of containers until the jammed container is removed and the containers in the runway separated so as to permit the automatic closing of the switch 77 through tension of spring 70, for restarting the closing machine or the carrier belt.

In the preferred form of the apparatus as described and explained above, all of the gauge rails 36, 37, 38, 39 are fixed and stationary, even though two of the rails are adjustable for accurate setting of these rails relative to the other rails. However it is not necessary that the apparatus be constructed in this manner. As a modified form of the apparatus, Figs. 6 to 10 inclusive discloses an apparatus similar to the preferred form but in which one set of gauge rails is fixed and another set is movable so that jamming of a container between the two sets, shifts the movable set and thereby actuates electric devices for giving a signal or for stopping the closing machine or the carrier belt as in the preferred form of apparatus.

In this modified form of the apparatus a carrier belt 101, similar to the carrier belt 21 of the preferred form, is used to carry the containers C in an upright position in spaced and processional order to and through a gauging station G. At the discharge end of the belt (at the right as viewed in Figs. 6 and 7), it is supported on a driving pulley 102 mounted on a driving shaft 103 journaled in a pair of spaced bearings 104 secured to a pair of spaced and parallel horizontal frame members 105 (see also Fig. 10) disposed one adjacent each edge of the belt and extending longitudinally of the belt toward the closing machine or entrance end of the belt. The drive shaft 103 may be actuated in any suitable manner.

At the closing machine end of the carrier belt 101, the belt is supported on an idler pulley 108 (Fig. 10) mounted on an idler shaft 109 journaled in a pair of spaced bearings 110 secured to the frame members 105. A pair of guide bars 112 (Figs. 6, 7 and 9) extending longitudinally of the carrier belt 101 and disposed above its upper run defines a runway 113 for keeping the containers in line as they advance with the belt. These guide bars 112 are secured by brackets 114 to the frame members 105. The carrier belt may be driven from a separate source of power as by an electric motor or may be driven from the closing machine as explained in connection with the preferred form of the invention.

At the gauging station G there is located a gauging device which includes a set or pair of fixed, stationary gauging rails comprising an upper gauge rail 116 (Figs. 9 and 10) having a smooth straight inner gauging face 117 and a lower gauge rail 118 having a similar inner gauging face 119. These fixed gauge rails 116, 118 are secured to a pair of brackets 121 longitudinally spaced along and adjacent the upper run of the carrier belt 101 and bolted to one of the frame members 105 (at the left as viewed in Fig. 10).

The lower gauge rail 118 is disposed immediately above the upper run of the carrier belt 101 with its gauging face 119 extending longitudinally and parallel with the belt so that it may be readily engaged by the bottom end seam B of a container C carried on the belt. The upper gauge rail 116 is disposed in vertically spaced relation to the lower gauge rail 118 a distance substantially equal to the height of the containers C so that the top end seam A of a container carried on the belt will engage against the gauging face 117 of the rail. This upper rail and its gauging face 117 are parallel with the lower rail 118 and its face 119. The gauging face 117 of the upper rail 116 is laterally offset or spaced inwardly of the vertical plane of the gauging face 119 of the lower rail 118 to tilt the container during the gauging operation as explained hereinbefore in connection with the preferred form of the apparatus. The leading ends of the gauging faces 117, 119 of the two rails 116, 118 are tapered as shown in Figs. 6 and 7 to facilitate engagement of the container seams with the gauging faces.

Between the upper and lower gauge rails 116, 118, the brackets 121 carry a stationary magnet or container retarding element 123 which is secured to the brackets. The magnet 123 preferably is a permanent magnet although an electromagnet may be used if desired. The magnet is disposed in a horizontal position and extends the full length of the gauge rails and in substantial parallelism therewith for attracting or drawing the containers C carried by the belt 101, into contact with the gauging faces 117, 119 of the rails.

Opposite the stationary gauge rails 116, 118, the gauging device is provided with a pair of vertically spaced and parallel movable gauge rails comprising an upper gauge rail 125 having a smooth straight inner gauging face 126 and a lower gauge rail 127 having a similar inner gauging face 128. The upper gauge rail 125 is disposed directly opposite the stationary upper gauge rail 116 and similarly the lower gauge rail 127 is disposed directly opposite the stationary lower gauge rail 118. However, the gauging face 126 of the movable upper gauge rail 125 is laterally offset or disposed outwardly of the vertical plane of the gauging face 128 of the lower gauge rail 127 to facilitate tilting of the containers C as they enter and pass through the gauging station as explained hereinbefore.

The upper and lower movable gauge rails 125, 127 are intended to move in unison and for this purpose they are tied together or connected by a pair of vertical brackets 131 as best shown in Fig. 8. These gauge rails 125, 127 are also adapted to swing in parallelogram fashion in relation to the fixed, stationary gauge rails 116, 118. For this latter purpose the upper movable gauge rail 125 is connected to the upper stationary gauge rail 116 by a pair of parallelogram arms 133, 134. These arms are of equal length and at their opposite ends are mounted on pivot pins 135 secured in the gauge rails as best shown in Fig. 10.

The parallelogram arm 133 at its end adjacent the stationary gauge rail 116 is formed with a projecting lug 137 (Figs. 6, 7 and 9) which carries one end of a tension spring 138. The opposite end of the spring is secured to a stationary stop lug 139 fastened to the upper stationary gauge rail 116. The spring 138 tends to rock the parallelogram arms 133, 134 through an arc toward the left as viewed in Figs. 6 and 7 and thus to draw the movable gauge rails 125, 127 toward the stationary gauge rails 116, 118. An adjustable set screw 141 carried in the arm lug 137 is provided for engagement with the stationary stop 139 to limit the inward travel of the movable gauge rails 125, 127.

For the normal setting of the movable gauge rails 125, 127 relative to the stationary gauge rails 116, 118, the set screw 141 is adjusted so that as it is held by the spring 138 against the stop 139, the parallelogram arms 133, 134 are disposed at a slight angle toward the left as shown in Fig. 6 and the space between the movable gauge rails is substantially equal to but not less than the outside diameter of the top and bottom end seams A, B of a container C when the seams are normal or complete as shown in Fig. 4. With the gauge rails in this normal spaced relation, containers having normal end seams, upon entering the gauging station G are tilted and rolled between the gauge rails through an angle of slightly more than 180 degrees in the same manner as explained hereinbefore in connection with the preferred form of the apparatus, the containers readily passing between the spaced gauge rails without interference for discharge to any suitable place of deposit for normal containers. The clearance between the container end seams and the movable gauge rails may be a mere few thousandths of an inch, this space being greatly exaggerated in Fig. 6 for the purpose of illustration.

For the detection of abnormal containers, i. e. those having incomplete, unfinished or otherwise distorted end seams which by virtue of these conditions have an outside diameter greater than normal seams, the parallelogram arms 133, 134 have a predetermined length which is calculated to substantially maintain the normal space between the movable and the stationary gauge rails even when the arms are swung into a position at right angles to the gauge rails as shown in Fig. 7, this being the peak position as the arms swing through an arc. Hence when a container C, such as the container marked Z in Fig. 7, having one or the other or both of its end seams A, B of an abnormal outside diameter, enters between the movable and the stationary gauge rails, it jams between the rails and swings the movable gauge rails outwardly into their peak position as shown in Fig. 7.

The outward swinging of the movable gauge rails 125, 127 actuates an electric control device which warns by signal that the container is jammed or stops the closing machine or the carrier belt to prevent further feeding of containers into the runway 113 or to stop advancement of the containers into the gauging station G. For this purpose the end of the parallelogram arm 134 adjacent the stationary gauge rail 116 is provided with a projecting lug 145 (Figs. 6, 7, 9 and 10) which carries an adjustable set screw 146 adjusted to engage and actuate a movable element 147 of a normally closed electric switch enclosed in a housing 148 secured to the upper stationary gauge rail 116. The electric switch is connected into an electric circuit which includes an electric motor 151 (Fig. 7) which drives the closing machine or the carrier belt. In the wiring diagram of the circuit (Fig. 7) the motor 151 is connected by a wire 152 to the switch. The motor is also connected by a wire 153 to a source of electric current such as a generator 154, which in turn is connected by a wire 155 to the switch.

Electric current passing along the above described circuit when the switch is closed, excites the motor 151 and keeps the closing machine in operation to feed containers into the runway 113 or maintains operation of the carrier belt to continue advancement of the containers into the gauging station E. This is the normal operation of the machine. However, when the switch is opened by movement of the movable gauge rails 125, 127, the circuit is broken and the motor ceases operation. This stops the closing machine or the carrier belt until the jammed container is removed manually and the movable gauge rails permitted to return to their normally spaced relation to the stationary gauge rails under the tension of the spring 138. Return of the rails to this normal position withdraws the set screw 146 from the movable element 147 of the switch and thus recloses the switch and re-establishes the motor circuit.

It is thought that the invention and many of its attendant advantages will be understod from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

We claim:

1. An apparatus for gauging articles according to a predetermined over-all dimension, comprising in combination means for propelling an article along a predetermined path of travel extending through a gauging station, a pair of oppositely disposed spaced and parallel gauge rails located at said gauging station at one level relative to said propelling means, a second pair of oppositely disposed spaced and parallel gauge rails located at said gauging station at another level relative to said propelling means, said pairs of gauge rails respectively gauging simultaneously top and bottom peripheral surfaces of the article, and article retarding means disposed adjacent said gauge rails to retard the advancement of articles passing through said gauging station for rolling a cylindrical article along one rail of each pair to insure full gauging of an entire circumference of the article to be gauged, one pair of said gauge rails being offset laterally relative to the other pair for tilting said article so that only a portion of one supporting edge engages said propelling means for aiding the rolling of a cylindrical article along said gauge rails, the gauge rails of each pair being spaced apart a distance substantially equal to but not less than the predetermined overall dimensions of the peripheral surfaces to be gauged for passing between said gauge rails articles having said predetermined over-all dimension and for stopping articles having an over-all dimension greater than said predetermined over-all dimension.

2. An apparatus for gauging cylindrical articles according to a predetermined diameter thereof, comprising in combination a conveyor for advancing said cylindrical articles in processional order along a path of travel, and a pair of oppositely disposed spaced and parallel gauge rails disposed in the path of article travel in substantial parallelism with said conveyor and normally spaced apart a distance substantially equal to but not less than the predetermined diameter of the articles to be gauged, said gauge rails cooperating with said conveyor for advancing while frictionally rotating between said gauge rails normal articles having said predetermined diameter and for detecting and arresting by wedging between said rails abnormal articles having a diameter greater than said predetermined diameter, one of said gauge rails being fixed and the other of said gauge rails being movable toward and away from said fixed rail by a said abnormal article having said greater diameter, and means operable by said movable gauge rail for stopping the operation of said conveyor when a said abnormal article is so detected and arrested in its advance by said conveyor.

3. An apparatus for gauging articles according to a predetermined over-all dimension, comprising in combination a conveyor for advancing articles in processional order along a path of travel, a stationary gauge rail disposed in the path of article travel in substantial parallelism with said conveyor, a movable gauge rail disposed opposite said stationary rail and in substantial parallelism therewith, a pair of parallelogram arms pivotally connected at their opposite ends to said stationary and movable rails respectively for maintaining said movable rail in parallelism with said stationary rail, pressure means acting against one of said parallelogram arms for maintaining said movable gauge rail in a normal parallel relation to said stationary gauge rail and spaced therefrom a distance substantially equal to but not less than the predetermined over-all dimension of a normal article to be gauged as it is freely advanced by said conveyor in frictional rolling contact with and between said rails, whereby abnormal articles having an over-all dimension greater than said predetermined over-all dimension are detected and arrested by wedging between said rails thereby cooperating with said conveyor and said parallelogram arms to swing said movable rail relative to said stationary rail, and means actuated by the swinging movement of said movable gauge rail for stopping said conveyor when a said abnormal article is so detected.

4. An apparatus for gauging articles according to a predetermined over-all dimension, comprising in combination a conveyor for advancing articles in processional order along a path of travel, a pair of fixed gauge rails disposed in vertically spaced relation in the path of article travel in substantial parallelism with said conveyor, a pair of movable gauge rails disposed in vertically spaced relation opposite said fixed rails in substantial parallelism therewith, said pairs of fixed and movable gauge rails gauging simultaneously top and bottom peripheral surfaces of the article advanced therebetween by said conveyor, said movable gauge rails being connected as a rigid unit for movement in unison, a pair of parallelogram arms pivotally connected at their opposite ends respectively to said fixed and movable rail pairs for maintaining said movable rails in substantial parallelism with said fixed rails, pressure means engaging one of said parallelogram arms for maintaining said movable gauge rails in a normal predetermined relation to said fixed gauge rails and spaced therefrom a distance substantially equal to but not less than the predetermined over-all dimension of a normal article to be gauged as it is advanced without obstruction by said conveyor between said fixed and movable rail pairs, whereby abnormal articles having an over-all dimension greater than said predetermined over-all dimension are detected and arrested by wedging between fixed and movable rails of said rail pairs thereby cooperating with said conveyor and said parallelogram arms to swing said movable rail unit relative to said fixed rail pair, and means actuated by the swinging movement of said movable rail unit for stopping said conveyor when a said abnormal article is detected and arrested as described.

5. An apparatus for gauging cylindrical articles in accordance with a predetermined diameter, comprising a conveyor for advancing a procession of said articles along a predetermined path of travel, a pair of horizontally spaced parallel gauge rails disposed on opposite sides of and in vertically spaced relation to said conveyor, said oppositely disposed gauge rails respectively simultaneously gauging opposed peripheral portions of the cylindrical articles advanced between said rails, said oppositely disposed rails being spaced apart horizontally a distance substantially equal to the predetermined diameter of the cylindrical articles for advancing between said rails normal articles having such predetermined diameter and for arresting by wedging between said rails abnormal articles having a diameter greater than said predetermined diameter, and movable means adjacent said conveyor rendered effective by an abnormal article wedged between said rails for stopping the operation of said conveyor until said wedged article is removed.

6. An apparatus for gauging cylindrical articles in accordance with a predetermined diameter, comprising a conveyor for advancing said articles along a predetermined path of travel, a pair of horizontally spaced parallel gauge rails disposed on opposite sides of and in vertically spaced relation to said conveyor, said oppositely disposed gauge rails respectively simultaneously gauging opposed peripheral portions of the cylindrical articles advanced between said rails, magnetic means disposed adjacent the gauge rail at one side of said conveyor means to draw said cylindrical articles into rolling contact with said adjacent rail to insure full circumferential gauging of the article by said opposed rails, said rails being spaced apart horizontally a distance substantially equal to the predetermined diameter of the cylindrical articles for passing between said rails normal articles having such predetermined diameter and for arresting by wedging between said rails abnormal articles having a diameter greater than said predetermined diameter, and movable means adjacent said conveyor rendered effective by a wedged abnormal article in said procession for stopping the operation of said conveyor until said wedged article is removed.

7. An apparatus for gauging cylindrical articles in accordance with a predetermined diameter, comprising conveyor means for advancing said articles along a predetermined path of travel extending through a gauging station, a pair of vertically spaced parallel gauge rails disposed at said station in vertically spaced relation to, said conveyor means, and a second pair of vertically spaced parallel gauge rails disposed opposite to said first mentioned rail pair at said station and at another vertical level relative to said conveyor means, the upper gauge rail of each rail pair being offset laterally relative to the lower gauge rails for tilting said articles on said conveyor means to facilitate rotation of said articles by frictional contact with one of said rail pairs, whereby said oppositely disposed pairs of gauge rails respectively simultaneously gauge opposed vertically spaced peripheral portions of the rotating cylindrical articles advanced between said rail pairs, the oppositely disposed vertically spaced rails of each rail pair being spaced apart horizontally a distance substantially equal to the predetermined diameter of the cylindrical articles for passing between said oppositely disposed pairs of gauge rails normal articles having such predetermined diameter and for arresting by wedging between said rail pairs abnormal articles having a diameter greater than said predetermined diameter, and movable means adjacent said conveyor rendered effective by an abnormal article wedged between said rails for indicating the presence of such abnormal article in said advancing procession.

8. An apparatus for gauging cylindrical articles in accordance with a predetermined diameter, comprising conveyor means for advancing said articles along a predetermined path of travel extending through a gauging station, a pair of vertically spaced parallel gauge rails disposed at said station in vertically spaced relation to said conveyor means, a second pair of vertically spaced parallel gauge rails disposed opposite to said first mentioned rail pair at said station, said oppositely disposed pairs of gauge rails respectively simultaneously gauging opposed vertically spaced peripheral portions of the cylindrical articles advanced between said rail pairs, and magnetic means disposed adjacent certain of said gauge rails at one side of said conveyor means to draw said cylindrical articles into rolling contact with the rails of one of said pairs to insure full circumferential gauging of the article by the opposed rails of both of said pairs, the oppositely disposed vertically spaced rails of each rail pair being spaced apart horizontally a distance substantially equal to the predetermined diameter of the cylindrical articles for passing between said oppositely disposed pairs of gauge rails normal articles having such predetermined diameter and for arresting by wedging between said rail pairs abnormal articles having a diameter greater than said predetermined diameter, and movable means adjacent said conveyor rendered effective by a wedged abnormal article in said procession for stopping the operation of said conveyor until said wedged article is removed.

9. An apparatus for gauging cylindrical articles in accordance with a predetermined diameter, comprising conveyor means for advancing said articles along a predetermined path of travel extending through a gauging station, a pair of vertically spaced parallel gauge rails disposed at said station in vertically spaced relation to said conveyor means, a second pair of vertically spaced parallel gauge rails disposed opposite to said first mentioned rail pair at said station, said oppositely disposed pairs of gauge rails respectively simultaneously gauging opposed vertically spaced peripheral portions of the cylindrical articles advanced between said rail pairs, the upper gauge rail of each rail pair being offset laterally relative to the lower gauge rails for tilting said articles on said conveyor means to facilitate rotation of said articles by frictional contact with one of said rail pairs, magnetic means disposed adjacent certain of said gauge rails at one side of said conveyor means to draw said cylindrical articles into rolling contact with said one rail pair to insure full circumferential gauging of the article by the opposed rails of both of said pairs, the oppositely disposed vertically spaced rails of each rail pair being spaced apart horizontally a distance substantially equal to the predetermined diameter of the cylindrical articles for passing between said oppositely disposed pairs of gauge rails normal articles having such predetermined diameter and for arresting by wedging between said rail pairs abnormal articles having a diameter greater than said predetermined diameter, and movable means adjacent said conveyor rendered effective by an abnormal article wedged between said rails for indicating the presence of such abnormal article in said advancing procession.

References Cited in the file of this patent
UNITED STATES PATENTS

| | | |
|---|---|---|
| 1,298,939 | Harris et al. | Apr. 1, 1919 |
| 1,358,255 | Seufer et al. | Nov. 9, 1920 |
| 1,476,023 | Phelps | Dec. 4, 1923 |
| 1,686,694 | Hauser | Oct. 9, 1928 |
| 1,916,255 | Cabot | July 4, 1933 |
| 1,963,083 | Fink | June 19, 1934 |
| 2,156,822 | Smith | May 2, 1939 |
| 2,323,190 | Begg | June 29, 1943 |
| 2,353,748 | Nordquist | July 18, 1944 |
| 2,417,148 | Wright | Mar. 11, 1947 |
| 2,533,606 | Natzke | Dec. 12, 1950 |
| 2,547,717 | Polk | Apr. 3, 1951 |
| 2,570,729 | Stover | Oct. 9, 1951 |